3,074,905
REACTIVE POLYVINYL CHLORIDE RESIN-REACTIVE ACRYLATE ESTER PLASTICIZER COMPOSITIONS
Stuart D. Douglas, deceased, late of Charleston, W. Va., by The National Bank of Commerce of Charleston, executor, Charleston, W. Va., assignor to Union Carbide Corporation
No Drawing. Filed Sept. 30, 1958, Ser. No. 764,222
9 Claims. (Cl. 260—45.5)

This invention relates to improved resin compositions comprising a reactive vinyl chloride resin plasticized with a reactive acrylate ester plasticizer and to the cured products obtained therefrom.

Conventional plasticizers used for the commercially available vinyl resins tend to migrate and eventually are lost due to rub-off, evaporation or by solution in solvents which come into contact with the plasticized resin, thus leaving the resin in a stiff and brittle condition. Some improvements have been made in overcoming these deficiencies to a slight extent, but the problem has not heretofore been satisfactorily solved.

The present invention is based on the discovery that certain reactive vinyl chloride copolymers can be plasticized with certain reactive acrylate esters to produce plasticized compositions which can be cured to produce homogeneous and compatible resin compositions having the plasticizers chemically bonded to the resin.

The reactive plasticizers that can be used in this invention are of a wide variety and are characterized by the presence of an acrylate ester radical, $CH_2=CZCOO-$, in the molecule. In this formula, Z can be hydrogen or a lower alkyl radical containing up to about 3 carbon atoms. The alcohol portion of the reactive acrylate ester plasticizer is derived from a diol. Thus, the reactive plasticizers can be represented by the general formula:

$$CH_2=COO(CH_2CH_2O)_nR$$
$$\phantom{CH_2=C}|$$
$$\phantom{CH_2=CO}Z$$

wherein $n$ is an integer having a value of from about 1 to about 6, Z has the meanings hereinbefore indicated, and R represents an alkyl radical containing from 1 to about 15 carbon atoms, a saturated acyl radical containing from 2 to about 10 carbon atoms, an unsaturated acyl radical containing from 3 to about 6 carbon atoms, an aroyl radical, or a carboalkoxyaroyl radical wherein the alkoxy group is a linear or branched alkyl radical containing up to about 10 carbon atoms as represented by the formula:

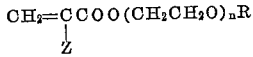
—OC /=\ COOalkyl(1—10 C)

Illustrative alkyl radicals are methyl, propyl, 2-ethylhexyl, decyl, trimethylnonyl, and the like. Illustrative saturated acyl radicals are acetyl, propionyl, 2-ethylhexionyl, and the like. Illustrative unsaturated acyl radicals are acrylyl, methacrylyl, and the like. Illustrative aroyl radicals are benzoyl, toluyl, and the like. Illustrative carboalkoxyaroyl radicals are 2-(carbo-2-methylhexoxy)-phthaloyl and similar radicals of the mono alkyl esters of phthalic acid, isophthalic acid and terphthalic acid as hereinafter further shown.

Among the reactive acrylate ester plasticizers which can be used in this invetnion there may be mentioned 2-(3-ethylbutoxy)-ethyl methacrylate, 2-(2-ethylhexoxy)-ethyl methacrylate, 2-(trimethylnonoxy)-ethyl methacrylate, 2-(beta-ethoxyethoxy)-ethyl methacrylate, 2-[beta-(2-ethylhexoxy)-ethoxy]-ethyl methacrylate, 2-[beta-(trimethylnonoxy)-ethoxy]-ethyl methacrylate, 2-(3-ethylbutoxy)-ethyl acrylate, 2-(beta-ethoxyethoxy)-ethyl acrylate, the bis methacrylic diester of pentaethyleneglycol, the acetyl methacrylate ester of tetraethylene glycol, the benzoate methacrylate ester of triethylene glycol, the mono-(2-ethylhexyl)phthalate ester of hydroxyethylmonomethacrylate, and the like.

The reactive vinyl chloride copolymers useful in this invention are the fusible and soluble vinyl chloride copolymers produced by copolymerizing vinyl chloride with an oxygen-containing multi-ethylenically unsaturated monomer, such as multi-ethylenically unsaturated monoether, di-ether, tri-ether, mono-ester, or di-ester, or mixtures thereof. These copolymers are the subject matter of a pending patent application "Thermoset Vinyl Copolymers," Serial No. 613,814, filed October 4, 1956.

The multi-ethylenically unsaturated oxygen containing monomers copolymerized with vinyl chloride to produce the reactive vinyl chloride copolymers are those compounds having at least one —C—O—C— linkage in the molecule. Also included among these compounds useful in this invention are those compounds which have an oxygen atom attached to one of the carbon atoms adjacent to the oxygen atom in the —C—O—C— linkage and which are known as esters. These multi-ethylenically unsaturated oxygen containing monomers are also characterized by the presence therein of at least two ethylenic groups and no other reactive polymerizable groups.

The multi-ethylenically unsaturated oxygen containing monomers can be mono-ethers, di-ethers, tri-ethers, mono-esters or di-esters which contain at least two ethylenically unsaturated groups in the molecule. An ethylenically unsaturated group is one which can be represented by the formula —CH=CH— wherein not more than one of the unsatisfied valences is substituted by a hydrogen atom. Illustrative of such compounds are allyl crotonate, crotyl crotonate, vinyl crotonate, diallyl oxalate, diallyl succinate, diallyl maleate, diallyl adipate, diallyl tetrachlorophthalate, diallyl pimelate, diallyl azelate, diallyl sebacate, diallyl phthalate, dicyclopentenyl phthalate, diallyl tetrahydrophthalate, dimethallyl succinate, alpha alkenyl divinyl adipate, divinyl pimelate, 1-allyloxy-2-vinyloxyethane, 1,2-divinyloxyethane, 1,2-diallyloxyethane, divinyl ether, diallyl ether, vinyl allyl ether, dicyclopentenyl ether, and the like multi-ethylenically unsaturated symmetrical or unsymmetrical compounds.

The reactive vinyl chloride copolymers can be produced by an organic solvent process or by aqueous emulsion or suspension process at temperatures below about 100° C. in the presence of a free radical type catalyst. In reactions below about 50° C. it is desirable to employ an activator such as, for example, sodium bisulfite, sodium sulfite, sodium hyposulfite, sodium sulfate, sulfur dioxide, and the like, to speed up the reaction. The reactive copolymers are soluble in ketones, alcohol-ethers, and in some aromatic hydrocarbons; for example, acetone, methyl ethyl ketone, cyclohexanone, toluene, ethylene glycol monobutyl ether, ethylene glycol ethylbutyl ether, and the like.

These reactive copolymers can be produced by reacting a mixture of vinyl chloride and oxygen-containing multi-ethylenically unsaturated monomer in the presence of a polymerization catalyst in an inert organic solvent at autogenous pressures at a temperature of from about 0° C. to about 90° C., preferably from about 40° C. to about 60° C. Suitable solvents are acetone, methyl ethyl ketone, cyclohexanone, toluene, and the like. The vinyl chloride content in the starting mixture can be varied from about 60 parts to about 99.5 parts per 100 parts of monomers mixture and the oxygen-containing multi-ethylenically unsaturated monomer content can be varied from about 0.5 part to about 40 parts when the reactive vinyl chloride copolymer is produced by the solvent process. The solvent to total monomer ratio can vary from about 70:30 to about 30:70 on a weight basis. However, when these reactive copolymers are produced by the aqueous emulsion process the vinyl chloride content in the starting mixture can be varied from about 92 parts to about 99.9 parts per 100 parts of the monomer mixture and the oxygen-containing multi-ethylenically unsaturated monomer content can be varied from about 0.1 part to about 8 parts by weight. In such process, the ratio of water, preferably deionized, to total monomers can be varied from about 70:30 to about 50:50 on a weight basis; and emulsifying agents at concentrations up to about 2% by weight are used. The aqueous emulsion process is carried out at autogenous pressures in a sealed vessel at temperatures of from about 10° C. to about 90° C., preferably from about 40° C. to about 60° C. in the presence of a catalyst. The copolymer is recovered by breaking the emulsion using conventional procedures and filtering and drying the precipitated copolymer.

Among the catalysts which can be used in producing the reactive vinyl chloride resins by the solvent process there can be mentioned, for example, acetyl peroxide, benzoyl peroxide, dichloroacetyl peroxide, di-t-butyl peroxide, t-butyl perbenzoate, and the like. Among the catalysts suitable in the aqueous emulsion process there are, for example, potassium persulfate, lauryl peroxide, alpha alpha' azobisisobutyronitrile, and the like. The catalysts are generally used at concentrations of from about 0.1% to about 3% by weight of the total monomers; preferably from about 0.5% to about 1% by weight.

In addition, chain transfer agents or degraders can be added to the monomers mixture to aid in controlling the molecular weight. Suitable degraders are isobutylene, dipentene, ethylene oxide, acetaldehyde, trichloroethylene and the like.

Suitable as emulsifying agents are surface active agents such as sodium lauryl sulfate, sodium dioctyl sulfosuccinate, sodium 1-isobutyl-4-ethyloctyl sulfate, and the like. Ordinarily, these are employed at concentrations of from about 0.1% to about 2% by weight based on the weight of the monomer mixture.

The improved plasticized compositions of this invention contain from about 50 to about 99 parts, preferably from about 70 to about 80 parts, of reactive vinyl chloride resin in admixture with from about 1 to about 50 parts, preferably from about 20 to about 30 parts, of reactive acrylate ester plasticizer, per 100 parts by weight of plasticized resin composition. In addition, the plasticized resin composition can contain conventional unreactive plasticizers such as dioctyl phthalate and the like; however, the total plasticizer content should be kept within the above limits.

The reactive acrylate ester plasticizer is added to the reactive vinyl chloride resin by conventional procedures preferably at temperatures below about 100° C. and the two are processed, for example, on a hot two-roll mill below about 100° C., until the fluxed sheet is homogeneous. Then a cure catalyst is added at a temperature below the activation temperature of the cure catalyst, preferably below about 100° C., and fluxing is continued until the catalyst is evenly distributed in the plasticized resin composition.

Among the cure catalysts which can be used to cure the plasticized composition are the organic peroxides, such as chlorobenzoyl peroxide, lauroyl peroxide, di-t-butyl peroxide, stearoyl peroxide, t-butyl perbenzoate, and the like; or mixtures of peroxides with other compounds, for example, a mixture of a mineral spirits solution of a zirconium-organo complex (technically known as Zirco Drier) and a rare earth metallic naphthenate (mainly lanthanum and cerium; technically known as Soligen Rare Earth) with t-butyl perbenzoate, or a mixture of cobalt octoate with t-butyl perbenzoate. The concentration of cure catalyst can be varied from about 1 part to about 8 parts, preferably from about 2 parts to about 3 parts, per 100 parts of plasticized vinyl chloride resin composition.

The catalyzed composition can be used in solution for coating wire, or other flat or shaped articles; the solutions can also be used in dip- and spray-coating applications. The dry catalyzed composition can be milled and molded, or extruded or shaped by conventional processes well known in the art and can be used, for example, to manufacture floor tiles.

The catalyzed reactive acrylate ester plasticizer-reactive vinyl chloride resin composition can be cured to insoluble and infusible form by heating at from about 100° C. to about 200° C. or higher for from about 3 minutes to about 40 minutes. The curing cycle is, of course, dependent on the conditions of time, temperature, pressure, and catalyst concentration employed. Preferably conditions are chosen so that the plasticized copolymer is completely cured in about 10 minutes at about 150° C.

The plasticized resin compositions can contain any of the additives normally present in resin compositions, such as lubricants, antioxidants, stabilizers, fillers, pigments and other coloring matters, carbon black, etc.

In the following examples the physical properties of the resins were determined as follows:

Tensile, elongation and load were obtained using a Scott L–6 tensile tester operating at a constant rate of elongation of 4 feet per minute with a variable rate of loading.
Stiffness modulus—A.S.T.M. D747–50.
$T_4$ and $T_F$—A.S.T.M. D1043–51.
$T_b$—A.S.T.M. D746–55T.
Hardness, Durometer A—A.S.T.M. D676–42T.

The following examples further serve to illustrate this invention. Parts are by weight unless otherwise specified.

*Example 1*

Seventy parts of a reactive resin produced by reacting vinyl chloride and diallyl succinate by the solution process, and containing 86.9% vinyl chloride and 13.1% diallyl succinate, was milled for 10 minutes at 40 to 50° C. with thirty parts of 2(3-ethylbutoxy)-ethyl methacrylate. A catalyst composition consisting of 2 parts of t-butyl perbenzoate, 1 part of Soligen Rare Earth and 0.2 part of Zirco Drier, per 100 parts by weight of reactive resin plus reactive plasticizer, was added to the mixture and milled at 40 to 50° C. until homogeneously dispersed therethrough. An insoluble, infusible and transparent 5.5 inch plaque (60 to 80 mils thick) which was molded therefrom at 150° C. at a pressure of 1500 p.s.i.g. for 10 minutes had the following properties:

| | |
|---|---|
| Tensile _____ p.s.i.__ | 3900 |
| Elongation _____ percent__ | 5 |
| Stiffness _____ p.s.i.___ | 81,600 |
| $T_F$ _____ ° C.__ | 34 |
| $T_4$ _____ ° C.__ | 46 |
| $T_B$ _____ ° C.__ | −8 |
| Hardness, Durometer A. _____ | 99 |

In a manner similar to that described in Example 1, plasticized resin compositions were produced using various reactive resins, reactive plasticizers, and catalyst compositions. For convenience these have been tabulated below.

| Example | 2 | 3 | 4 | 5 | 6 | 7 | 8 | 9 | 10 | 11 |
|---|---|---|---|---|---|---|---|---|---|---|
| Reactive Vinyl Chloride copolymer, pts | 70 | 70 | 70 | 70 | 70 | 70 | 70 | 60 | 90 | 70 |
| Vinyl chloride, percent | 86.9 | 86.9 | 86.9 | 86.9 | 86.9 | 86.9 | 86.9 | 86.9 | 87.9 | 96.2 |
| Comonomer, percent, diallyl succinate | 13.1 | 13.1 | 13.1 | 13.1 | 13.1 | 13.1 | 13.1 | 13.1 | 12.1 | 3.8 |
| Reactive Plasticizer, pts.: | | | | | | | | | | |
| 2-(2-ethylhexoxy)-ethyl methacrylate | 30 | | | | | | | | | |
| 2-(trimethylnonoxy)-ethyl methacrylate | | 30 | | | | | | | | |
| 2-[beta-(2-ethylhexoxy)-ethoxy]-ethyl methacrylate | | | 30 | | | | | | | |
| 2-[beta-(trimethylnonoxy)-ethoxy]-ethyl methacrylate | | | | 30 | 30 | 30 | | | | |
| benzoate methacrylate diester of triethyleneglycol | | | | | | | | 30 | | |
| 1:1 blend of dioctyl phthalate and the mono-(2-ethylhexyl)-phthalate ester of hydroxyethylmonomethacrylate | | | | | | | | | 40 | |
| bis-methacrylic diester of pentethylene glycol | | | | | | | | | 10 | 30 |
| Catalyst | (a) | (a) | (a) | (a) | (a) | (a) | (a) | (a) | (a) | (a) |
| Milling Conditions: | | | | | | | | | | |
| Minutes | 10 | 10 | 10 | 10 | 10 | 10 | 10 | 15 | 10 | 10 |
| Temp., °C | 45 | 60–80 | 65–75 | 50–65 | 65–75 | 50–65 | 50–80 | 20–60 | 50–70 | 80–90 |
| Molding Conditions: | | | | | | | | | | |
| Minutes | 10 | 10 | 10 | 10 | 10 | 10 | 10 | 10 | 10 | 10 |
| Temp., °C | 150 | 150 | 150 | 150 | 150 | 170 | 150 | 150 | 150 | 150 |
| Tensile, p.s.i. | 3,475 | 3,850 | 2,800 | 1,100 | 3,500 | 1,400 | 4,300 | 1,400 | | |
| Elongation, percent | 5 | 0 | 0 | 90 | 5 | 35 | 5 | 25 | | |
| Stiffness, p.s.i. | 79,800 | 34,520 | 64,800 | 13,150 | 60,000 | 7,600 | 87,600 | 2,160 | | |
| $T_F$, °C | 32 | 3 | 9 | −10 | 21 | 0 | 26 | 4 | | |
| $T_4$, °C | 45 | 39 | 40 | 15 | 48 | 26 | 40 | 24 | | |
| $T_B$, °C | −4 | 4 | 16 | 8 | >38 | 10 | 34 | 24 | | |
| Hardness, Durometer A | 98 | 90 | 92 | 71 | 90 | 91 | 95 | 76 | | |

(a)=2% t-butyl perbenzoate, 1% Soligen Rare Earth, 0.2% Zirco Crier.

What is claimed is:
1. A vinyl chloride copolymer resin composition plasticized with a reactive plasticizer; said vinyl chloride copolymer resin consisting of the copolymerization product of from about 60 to about 99.5 parts by weight of vinyl chloride with from about 0.5 to about 40 parts by weight of an oxygen-containing multi-ethylenically unsaturated monomer containing at least two ethylenically unsaturated groups and no other reactive polymerizable groups and having carbon, hydrogen, and oxygen atoms only selected from the group consisting of mono-ethers, di-ethers, tri-ethers, and mono-esters and di-esters of carboxylic acids, and said reactive plasticizer selected from the group consisting of esters represented by the general formula:

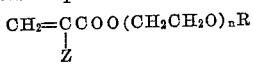

wherein $n$ is an integer having a value of from 1 to about 6; Z is a member selected from the group consisting of hydrogen atoms and lower alkyl radicals and R is a member selected from the group consisting of alkyl radicals containing up to about 15 carbon atoms, saturated acyl radicals containing from 2 to about 10 carbon atoms, unsaturated acyl radicals containing from 3 to about 6 carbon atoms, aroyl radicals and carboalkoxyaroyl radicals.

2. A vinyl chloride copolymer resin composition comprising from about 50 to about 99 parts by weight of a reactive vinyl chloride copolymer resin plasticized with from about 1 to about 50 parts by weight of a reactive plasticizer; said reactive vinyl chloride copolymer resin consisting of the copolymerization product of from about 60 to about 99.5 parts by weight of vinyl chloride with from about 0.5 to about 40 parts by weight of an oxygen-containing multi-ethylenically unsaturated monomer containing at least two ethylenically unsaturated groups and no other reactive polymerizable groups and having carbon, hydrogen, and oxygen atoms only selected from the group consisting of mono-ethers, di-ethers, tri-ethers, and mono-esters and di-esters of carboxylic acids, and said reactive plasticizer selected from the group consisting of esters represented by the general formula:

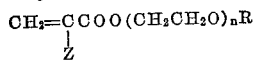

wherein $n$ is an integer having a value of from 1 to about 6; Z is a member selected from the group consisting of hydrogen atoms and lower alkyl radicals and R is a member selected from the group consisting of alkyl radicals containing up to about 15 carbon atoms, saturated acyl radicals containing from 2 to about 10 carbon atoms, unsaturated acyl radicals containing from 3 to about 6 carbon atoms, aroyl radicals and carboalkoxyaroyl radicals.

3. A vinyl chloride copolymer resin composition comprising from about 70 to about 80 parts by weight of a reactive vinyl chloride copolymer resin plasticized with from about 20 to about 30 parts by weight of a reactive plasticizer; said reactive vinyl chloride copolymer resin consisting of the copolymerization product of from about 60 to about 99.5 parts by weight of vinyl chloride with from about 0.5 to about 40 parts by weight of an oxygen-containing multi-ethylenically unsaturated monomer containing at least two ethylenically unsaturated groups and no other reactive polymerizable groups and having carbon, hydrogen, and oxygen atoms only selected from the group consisting of mono-ethers, di-ethers, tri-ethers, and mono-esters and di-esters of carboxylic acid, and said reactive plasticizer selected from the group consisting of esters represented by the general formula:

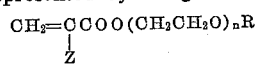

wherein $n$ is an integer having a value of from 1 to about 6; Z is a member selected from the group consisting of hydrogen atoms and lower alkyl radicals and R is a member selected from the group consisting of alkyl radicals containing up to about 15 carbon atoms, saturated acyl radicals containing from 2 to about 10 carbon atoms, unsaturated acyl radicals containing from 3 to about 6 carbon atoms, aroyl radicals and carboalkoxyaroyl radicals.

4. A vinyl chloride copolymer resin composition comprising from about 50 to about 99 parts by weight of a reactive vinyl chloride copolymer resin plasticized with from about 1 to about 50 parts by weight of 2-(2-ethylhexoxy)-ethyl methacrylate; said vinyl chloride copolymer resin consisting of the copolymerization product of from about 60 to about 99.5 parts by weight of vinyl chloride with from about 0.5 to about 40 parts by weight of diallyl succinate.

5. A vinyl chloride copolymer resin composition comprising from about 50 to about 99 parts by weight of a reactive vinyl chloride copolymer resin plasticized with from about 1 to about 50 parts by weight of 2-(trimethylnonoxy)-ethyl methacrylate; said vinyl chloride copolymer resin consisting of the copolymerization product of from about 60 to about 99.5 parts by weight of vinyl chloride with from about 0.5 to about 40 parts by weight of diallyl succinate.

6. A vinyl chloride copolymer resin composition comprising from about 50 to about 99 parts by weight of a reactive vinyl chloride copolymer resin plasticized with from about 1 to about 50 parts by weight of 2-[beta-(2-ethylhexoxy)-ethoxy]-ethyl methacrylate; said vinyl chloride copolymer resin consisting of the copolymerization product of from about 60 to about 99.5 parts by weight of vinyl chloride with from about 0.5 to about 40 parts by weight of diallyl succinate.

7. A vinyl chloride copolymer resin composition comprising from about 50 to about 99 parts by weight of a reactive vinyl chloride copolymer resin plasticized with from about 1 to about 50 parts by weight of 2-[beta-(trimethylnonoxy)-ethoxy]-ethyl methacrylate; said vinyl chloride copolymer resin consisting of the copolymerization product of from about 60 to about 99.5 parts by weight of vinyl chloride with from about 0.5 to about 40 parts by weight of diallyl succinate.

8. A vinyl chloride copolymer resin composition comprising from about 50 to about 99 parts by weight of a reactive vinyl chloride copolymer resin plasticized with from about 1 to about 50 parts by weight of the benzoate methacrylate diester of triethyleneglycol; said vinyl chloride copolymer resin consisting of the copolymerization product of from about 60 to about 99.5 parts by weight of vinyl chloride with from about 0.5 to about 40 parts by weight of diallyl succinate.

9. A vinyl chloride copolymer resin composition comprising from about 50 to about 99 parts by weight of a reactive vinyl chloride copolymer resin plasticized with from about 1 to about 50 parts by weight of the mono-(2-ethylhexyl)-phthalate ester of hydroxyethylmonomethacrylate; said vinyl chloride copolymer resin consisting of the copolymerization product of from about 60 to about 99.5 parts by weight of vinyl chloride with from about 0.5 to about 40 parts by weight of diallyl succinate.

References Cited in the file of this patent

UNITED STATES PATENTS

| | | |
|---|---|---|
| 2,155,590 | Garvey | Apr. 25, 1939 |
| 2,318,959 | Muskat | May 11, 1943 |
| 2,377,095 | Muskat | May 29, 1945 |
| 2,532,502 | Joy | Dec. 5, 1950 |
| 2,567,719 | Loritsch et al. | Sept. 11, 1951 |
| 2,609,355 | Winkler | Sept. 2, 1952 |
| 2,611,195 | Brophy et al. | Sept. 23, 1952 |
| 2,719,132 | Schweitzer | Sept. 27, 1955 |
| 2,849,332 | Smith et al. | Aug. 26, 1955 |
| 2,958,673 | Jen | Nov. 1, 1960 |